US012045909B2

(12) United States Patent
Gopalakrishnan et al.

(10) Patent No.: US 12,045,909 B2
(45) Date of Patent: Jul. 23, 2024

(54) APPARATUSES, SYSTEMS, AND METHODS FOR DYNAMICALLY SWITCHING GRAPHICS MODES FOR PROVIDING A DISPLAY SIGNAL

(71) Applicant: Intel Corporation, Santa Clara, CA (US)

(72) Inventors: Venkataramani Gopalakrishnan, Folsom, CA (US); Ravishankar Subramanian, Bangalore (IN); Shrestha Sinha, Folsom, CA (US); Duane Quiet, Hillsboro, OR (US); James Akiyama, Beaverton, OR (US); Satish Ramanathan, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 803 days.

(21) Appl. No.: 17/016,126

(22) Filed: Sep. 9, 2020

(65) Prior Publication Data

US 2020/0410630 A1    Dec. 31, 2020

(51) Int. Cl.
| G06F 13/00 | (2006.01) |
| G06F 9/38 | (2018.01) |
| G06F 13/38 | (2006.01) |
| G06F 13/40 | (2006.01) |
| G06T 1/20 | (2006.01) |

(52) U.S. Cl.
CPC .............. *G06T 1/20* (2013.01); *G06F 9/3877* (2013.01); *G06F 13/382* (2013.01); *G06F 13/4022* (2013.01); *G06F 13/4027* (2013.01); *G06F 2213/0038* (2013.01)

(58) Field of Classification Search
CPC .. G06F 13/382; G06F 13/385; G06F 13/4027; G06F 9/3877; G06F 13/4022; G06F 2213/0038; G06F 2213/0042; G06T 1/20; G09G 5/003
See application file for complete search history.

(56) References Cited

U.S. PATENT DOCUMENTS

| 9,865,233 | B2 * | 1/2018 | Kwa | ......................... G09G 5/36 |
| 10,224,003 | B1 * | 3/2019 | Akiyama | .................. G06F 3/14 |
| 2019/0102334 | A1 * | 4/2019 | Berchanskiy | ............. G06F 3/14 |

* cited by examiner

*Primary Examiner* — Hau H Nguyen
(74) *Attorney, Agent, or Firm* — Hanley, Flight & Zimmerman, LLC

(57) ABSTRACT

Embodiments are directed toward apparatuses, systems, and methods to implement policies for dynamically switching between an integrated graphics mode and a discrete graphics mode for providing a display signal to an external USB Type-C port. Some embodiments include a controller configured to provide signals to a first multiplexer and to a second multiplexer, and based on a platform policy, control the at least first or the second multiplexer to dynamically switch to the first graphics mode to output signals received from an integrated graphics controller to the external USB Type-C port or to switch to the second graphics mode to output signals received from a discrete graphics controller to the external USB Type-C port. Other embodiments may be described and/or claimed.

17 Claims, 8 Drawing Sheets

APPARATUSES, SYSTEMS, AND METHODS FOR DYNAMICALLY SWITCHING GRAPHICS MODES FOR PROVIDING A DISPLAY SIGNAL

FIELD

Embodiments of the present disclosure generally relate to the field of computing, and more specifically to dynamically switching graphics modes for efficient use of resources associated with a USB Type-C Subsystem.

BACKGROUND

For high performance graphics applications, a discrete graphics solution may offer higher performance than an integrated graphics solution. An integrated graphics solution may refer to the use of an integrated graphics controller that may share memory and other resources with the CPU of the platform. For example, the integrated graphics controller may include a graphics processing unit (GPU) integrated into a system on a chip (SoC) or other die with a central processing unit (CPU). In contrast, a discrete graphics solution may include a separate graphics controller as a separate graphics subsystem, e.g., a graphics card or separate graphics chip, that may have their own dedicated processor(s) and memory. The discrete graphics system may offer better performance for graphics heavy applications but may also use significantly more battery power and resources than the integrated graphics solution.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
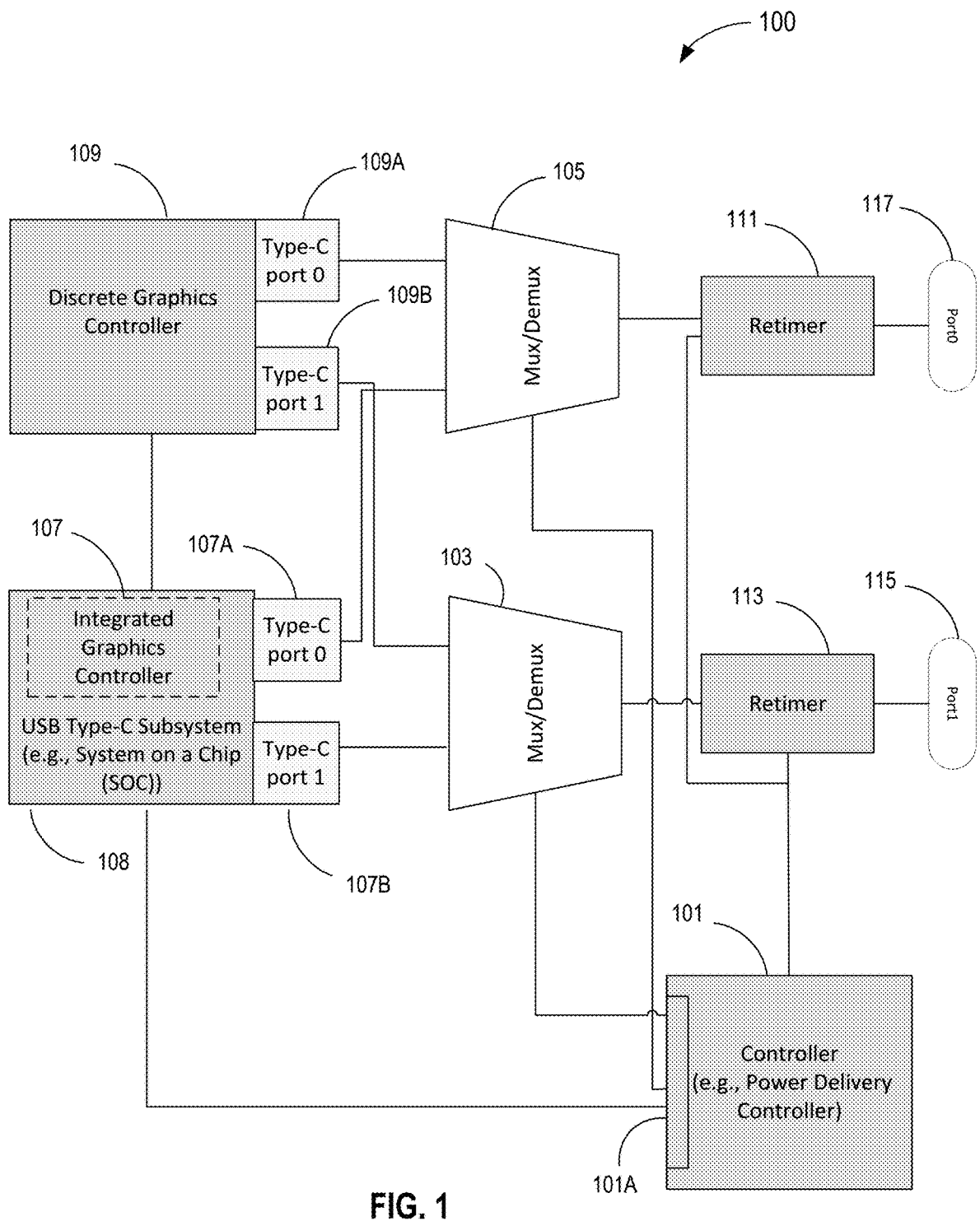
FIG. 1 is a block diagram illustrating an example USB Type-C ecosystem including a controller coupled to dynamically switch multiplexers between a first graphics mode and a second graphics mode, according to embodiments of the present disclosure.

Embodiments of the present disclosure are directed toward apparatuses, methods, and systems for implementing policies to dynamically switch a platform between a first graphics mode and a second graphics mode associated with providing a display signal to an external USB Type-C port. In some embodiments, the first graphics mode includes, e.g., an integrated graphics mode and the second mode includes, e.g., a discrete graphics mode. In embodiments, a controller provides signals to a first multiplexer and to a second multiplexer to, based on a platform policy, control at least the first or second multiplexer to respectively output signals received from an integrated graphics controller or to output signals received from a discrete graphics controller. Other embodiments may be described and/or claimed.

In the following description, various aspects of the illustrative implementations will be described using terms commonly employed by those skilled in the art to convey the substance of their work to others skilled in the art. However, it will be apparent to those skilled in the art that embodiments of the present disclosure may be practiced with only some of the described aspects. For purposes of explanation, specific numbers, materials, and configurations are set forth in order to provide a thorough understanding of the illustrative implementations. However, it will be apparent to one skilled in the art that embodiments of the present disclosure may be practiced without the specific details. In other instances, well-known features are omitted or simplified in order not to obscure the illustrative implementations.

In the following detailed description, reference is made to the accompanying drawings that form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

For the purposes of the present disclosure, the phrase "A or B" means (A), (B), or (A and B). For the purposes of the present disclosure, the phrase "A, B, or C" means (A), (B), (C), (A and B), (A and C), (B and C), or (A, B, and C).

The description may use perspective-based descriptions such as top/bottom, in/out, over/under, and the like. Such descriptions are merely used to facilitate the discussion and are not intended to restrict the application of embodiments described herein to any particular orientation.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

The term "coupled with," along with its derivatives, may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. The term "directly coupled" may mean that two or more elements are in direct contact.

In some cases, various operations will be described as multiple discrete operations in turn, in a manner that is most helpful in understanding the present disclosure; however, the order of description should not be construed to imply that these operations are necessarily ordered dependent. In particular these operations need not be performed in the order of presentation, e.g., the flow diagrams of FIGS. 2-5.

As noted above, embodiments of the present disclosure include apparatuses, methods, and systems, for implementing policies for dynamically switching a platform between an integrated graphics mode and a discrete graphics mode, for providing a display signal to an external USB Type-C port.

FIG. 1 is a block diagram illustrating an example USB Type-C ecosystem 100 including a controller coupled to dynamically switch multiplexers between a first graphics mode and a second graphics mode, according to embodiments of the present disclosure. As shown, USB Type-C ecosystem 100 includes a controller 101 at a bottom right of FIG. 1 (e.g., a power delivery ("PD") controller) that, based on a platform policy, will control or configure at least one or more of a multiplexer 103 and multiplexer 105 to dynamically switch between graphics modes. In the embodiment, USB Type-C ecosystem 100 includes an integrated graphics controller 107 included in a USB Type-C subsystem such as a System on a Chip (SoC) 108. Also shown, for the embodiment, is a discrete graphics controller with an integrated Type-C subsystem 109 ("discrete graphics controller 109"), and redrivers or retimers 111 and 113 respectively coupled to external USB Type-C port 115 and external USB Type-C port 117 ("port 115" or "port 117"). As illustrated, in the embodiment, discrete graphics controller 109 includes a first port 109A and a second port 109B. As shown, first port 109A and second port 109B are internal USB Type-C ports or logical ports. Likewise, for the embodiment, an SoC or USB Type-C subsystem 108 including integrated graphics controller 107 includes a first port 107A and a second port 107B, which are also internal USB Type-C ports or logical ports.

As illustrated in FIG. 1, controller 101 is coupled to a controller interface 101A ("interface 101A") to provide signals via interface 101A to multiplexers 103 and 105. In embodiments, controller 101 is to, based on a platform policy, control at least one or more of multiplexer 103 and multiplexer 105 to dynamically switch between a first graphics mode and a second graphics mode. For example, the controller 101 may control at least one or more of multiplexer 103 and multiplexer 105 to dynamically switch to a discrete graphics mode to output signals received from discrete graphics controller 109 to corresponding external USB Type-C port(s) 115 or 117, or, to switch to an integrated graphics mode to output signals received from integrated graphics controller 107 to corresponding external USB Type-C port(s) 115 or 117. In embodiments, one or both of ports 115 and 117 may be connected to a corresponding external display (not shown) or dock (not shown). Note that in embodiments, retimers 111 and 113 are coupled to respective multiplexers 103 and 105 to condition signals for output at respective external USB Type-C ports 115 or 117.

Note that embodiments utilize USB Type-C ports to achieve a configuration that enables a hardware configuration that uses two multiplexers (e.g., multiplexers 103 and 105) to supports dynamic switching between the discrete graphics mode and the integrated graphics mode. In embodiments, as shown, multiplexer 105 is coupled to receive a first signal from a first USB Type-C port (109A) of discrete graphics controller 109 and a second signal from a first port of the USB Type-C port (107A) of integrated graphics controller 107 (e.g., of USB Type-C subsystem 108 including integrated graphics controller 107). In embodiments, multiplexer 103 is coupled to receive a third signal from a second USB Type-C port of the discrete graphics controller (109B) and a fourth signal from second USB Type-C port (107B) of the integrated graphics controller 107 (e.g., of USB Type-C subsystem 108 including integrated graphics controller 107).

Figure 2:
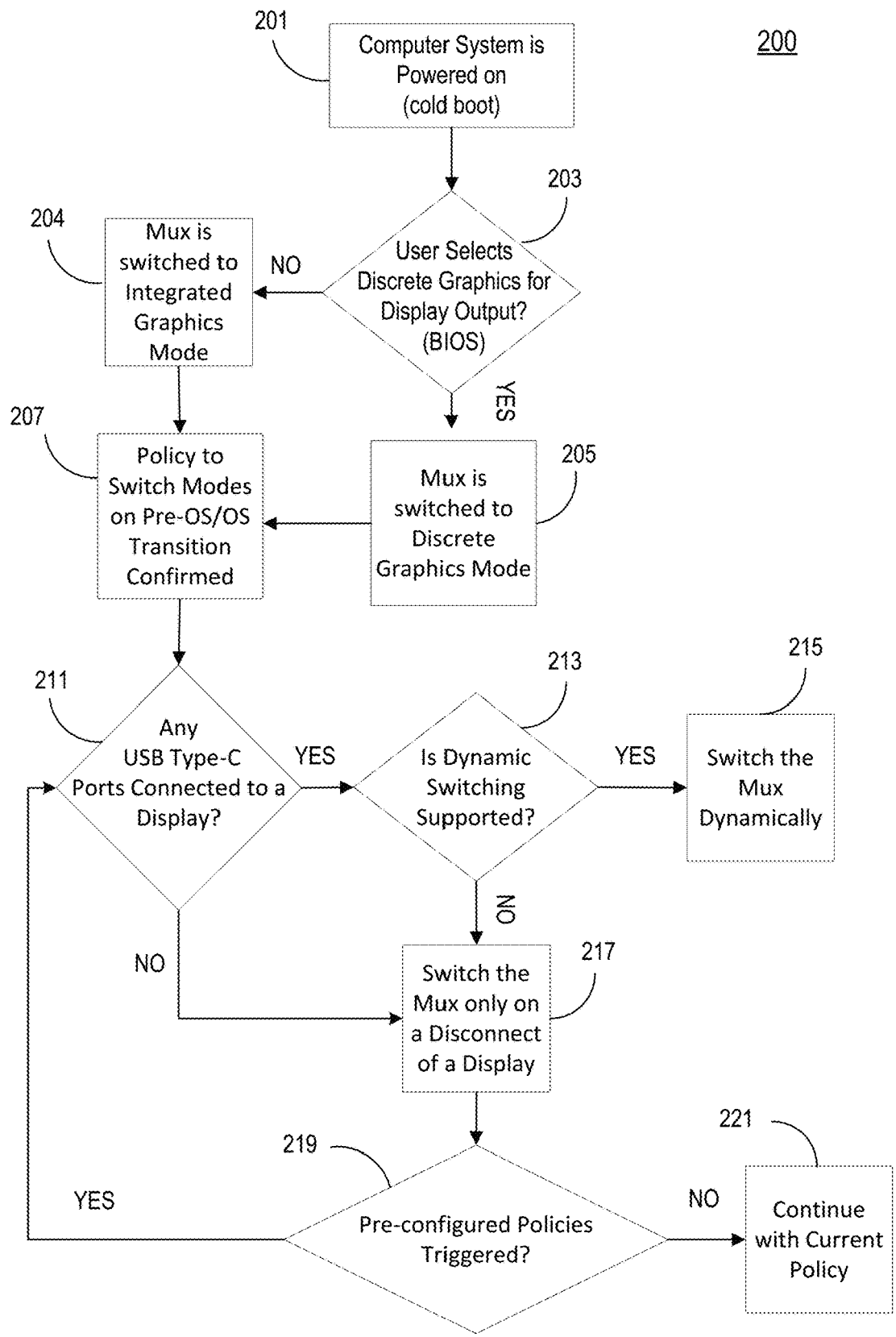
FIG. 2 is a flow diagram associated with the embodiment of FIG. 1, according to embodiments of the present disclosure.

FIG. 2 is a flow diagram illustrating a method 200 that depicts an embodiment associated with implementing a platform policy ("policy") associated with the USB Type-C ecosystem 100 of FIG. 1. In embodiments, method 200 describes an embodiment where a controller, e.g., controller 101 of FIG. 1, delays dynamic switching between a first graphics mode and a second graphics mode if implementation of the USB Type-C ecosystem 100 of FIG. 1 is not supported by additional elements. In some embodiments, the additional elements include supporting platform software and/or hardware components to prevent a blank screen from displaying to a user during the dynamic switching. In embodiments, certain elements of method 200 are practiced by controller 101 and/or in conjunction with assistance from a microcontroller, e.g., an embedded controller (EC). In embodiments, the EC (shown in FIG. 6) is coupled to a SoC (e.g., USB Type-C Subsystem 108 of FIG. 1) and controller 101 through an I2C bus on a motherboard including the components of FIG. 1.

Thus, in embodiments, where dynamic switching as described in FIG. 1 is not supported by additional platform software and/or hardware components, a connected external display to external port 115 and/or external port 117 displays a blank screen during dynamic switching unless one or more policies as described are followed. In embodiments, beginning at a block 201, a platform or computer system including ecosystem 100 of FIG. 1, is powered on by a user. At block 203, once the computer system is booted, method 200 gives the user an option during a Basic Input/Output System (BIOS) phase to select a discrete graphics mode for providing a display signal as an output to one or more external displays. In embodiments, the one or more external displays are connected to one or more of external USB Type-C ports, e.g., port(s) 115 or 117. If the user does not select the discrete graphics mode for providing the display signal at a block 203, method 200 moves to a block 204, where one or more multiplexers (referred to as "Mux" in the FIGS.), e.g., multiplexers 103 and/or 105 of FIG. 1, are switched to an integrated graphics mode. In the alternative, if the user does select discrete graphics mode as the display signal to be output to the external port, the method 200 moves to block 205, where the multiplexers are switched to the discrete graphics mode.

In the embodiment, at a next block 207, method 200 confirms that a pre-existing platform policy to switch between integrated and discrete graphics modes during a pre-operating system (pre-OS or BIOS phase) to operating system (OS) transition exists. Note that if the pre-existing platform policy does not exist, then modes that are selected or configured in the pre-OS or BIOS phase will carry over to the OS runtime. In embodiments, method 200 then moves to decision block 211, where once the platform has transitioned to OS control, checks whether an external port (e.g., one or more of ports 115 and 117 of FIG. 1) is actually connected to an external display. In embodiments, if the answer is YES, method 200 moves to decision block 213. At block 213, method 200 checks whether dynamic switching is supported by the platform. Accordingly, if the answer is YES, the flow moves to a next block 215, where the multiplexers are dynamically switched to a discrete graphics mode.

In the alternative, if the answer is NO at block 213 and dynamic switching is not supported by the platform, method

200 moves to block 217. In embodiments, at block 217 the multiplexers will only be dynamically switched upon when and if there is a disconnect of a display at the external USB Type-C ports. In embodiments, such a delay of the dynamic switching prevents a blank screen being presented to the user on the display.

Note that at decision block 211, if the answer is NO as to whether an external port is actually connected to a display, then there is no need for dynamic switching at this time. Accordingly, in embodiments, the flow moves from block 211 to block 217 where again dynamic switching is only to occur on disconnect of a display.

In addition, in embodiments after block 217, at a block 219, method 200 checks to confirm whether pre-configured policies are triggered (e.g., user pre-configured policies to be initiated during the OS runtime). If the answer is NO, method 200 moves to block 221 where the platform will continue with current policy. In embodiments, if the answer is YES, and pre-configured policies are triggered, method 200 then flows back to decision block to 211 and rechecks whether one or more of the ports are connected to an external display. Method 200 then continues to loop through blocks to 211 through 219 as appropriate.

Figure 3A:
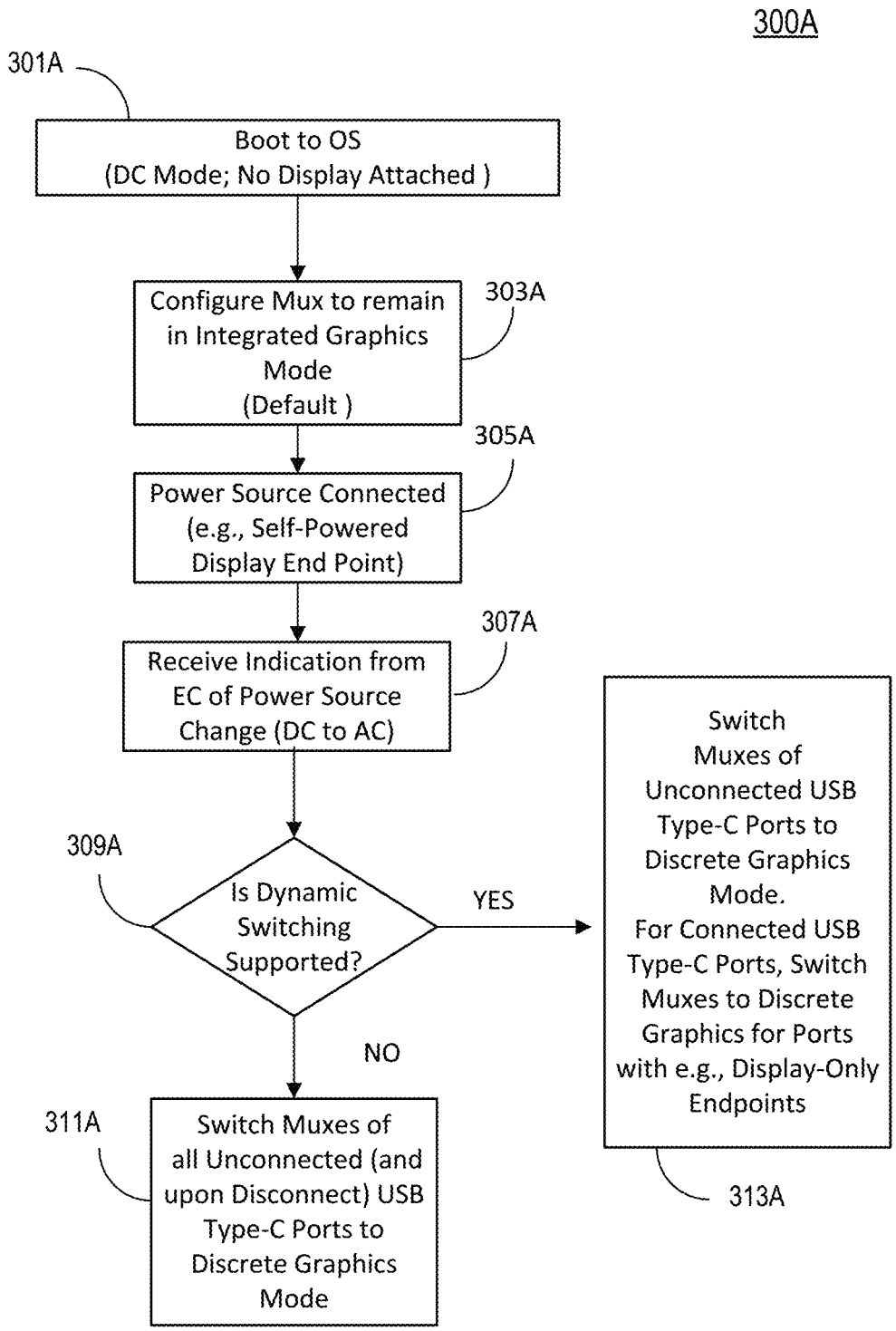
FIGS. 3A and 3B are flow diagrams that depict embodiments associated with policies related to conserving battery power for the example USB Type-C ecosystem of FIG. 1, according to embodiments of the present disclosure.
Figure 3B:
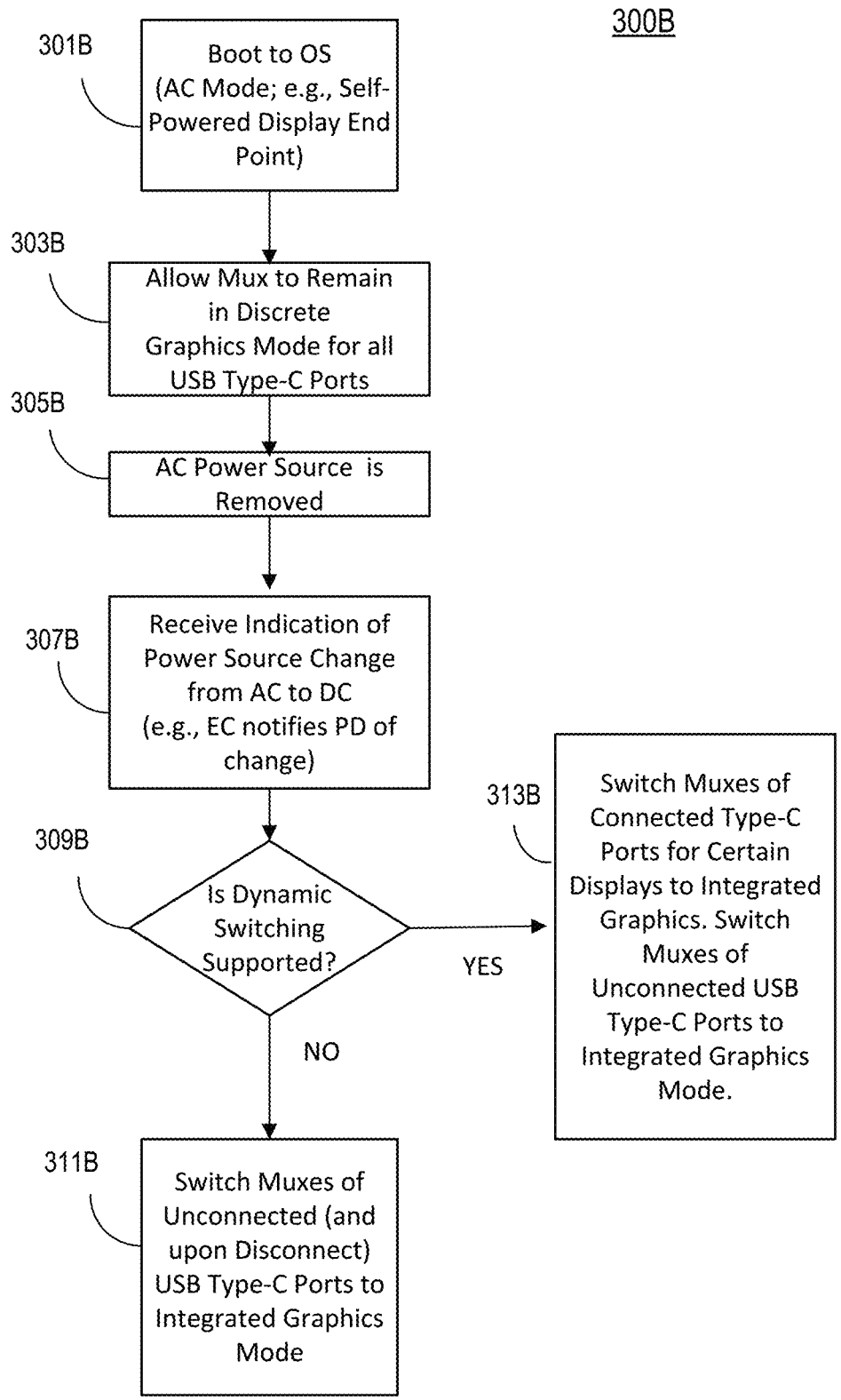

FIGS. 3A and 3B are flow diagrams 300A and 300B that depict embodiments associated with policies related to conserving battery power for a computer system or platform. In embodiments, a policy (e.g., a default policy) includes to control or configure one or more multiplexers (e.g., multiplexer 103 and 105 of FIG. 1) to operate in an integrated graphics mode when the platform is in a battery mode (DC) and to operate in the discrete graphics mode when the platform is in an alternating current (AC) mode. FIG. 3A illustrates an embodiment 300A where a platform remains in a default integrated graphics until an AC power source is introduced.

In embodiments, elements of flow diagrams 300A and 300B may be practiced by a controller, e.g., a PD controller or controller 101 of FIG. 1, and/or in conjunction with assistance from a microcontroller, e.g., an embedded controller (EC).

Flow diagram 300A, in embodiments, begins at a block 301A where the platform boots to OS runtime while in a direct current (DC) mode. Accordingly, one or more multiplexers begin and remain in an integrated graphics mode (e.g., a default mode), for all USB Type-C ports, as shown at block 303A. In embodiments, at a next block 305A, the platform is connected to a power source, such as an AC source (e.g., a display that provides power to the platform, e.g., a self-powered display endpoint) is connected by a user to an external USB Type-C port (e.g., external ports 115 and 117 of FIG. 1). In embodiments, at a next block 307A, the controller receives a notification (e.g., from the EC) of a power source change from a DC to AC power source. At a next block 309A, in the embodiment, the controller checks if dynamic switching is supported. If the answer is YES, flow diagram 300A moves to block 313A where the controller switches one or more multiplexers of unconnected USB Type-C ports to discrete graphics mode. In some embodiments, for connected Type-C Ports, the multiplexers are switched for certain endpoints, e.g., display-only endpoints. If the answer at block 309A was NO, the flow moves to block 311A where the controller switches multiplexers of all disconnected USB type C ports to the discrete graphics mode.

FIG. 3B illustrates a flow diagram 300B where one or more multiplexers are in a default discrete graphics mode while the platform is using an AC power source, and then are dynamically switched to an integrated graphics mode, when a DC power source is introduced. Accordingly, at a beginning block 301B, the platform boots to an OS run-time while in AC mode. As shown at next block 303B, one or more multiplexers are thus allowed to remain in the discrete graphics mode for all USB Type-C ports. Next, in embodiments, at block 305B, the AC power source is removed. For the embodiment, at a next block 307B, the controller is notified that a power source change which has occurred (e.g., the EC notifies PD controller that the power source has changed from AC to DC). Next, at a block 309B the controller checks to determine if dynamic switching is supported. If the answer is YES, the flow moves to block 313B, where the controller switches one or more multiplexers of unconnected USB Type-C ports to the integrated graphics mode. In some embodiments, multiplexers coupled to certain endpoints, e.g., display—only endpoints for connected USB Type-C ports, are switched to integrated graphics mode.

Finally, for the embodiment, if at block 309B, the answer to whether dynamic switching is supported is NO, method 300C moves to block 311B where the controller switches multiplexers of only unconnected (and, upon becoming disconnected) USB Type-C ports to integrated graphics mode.

Figure 4A:
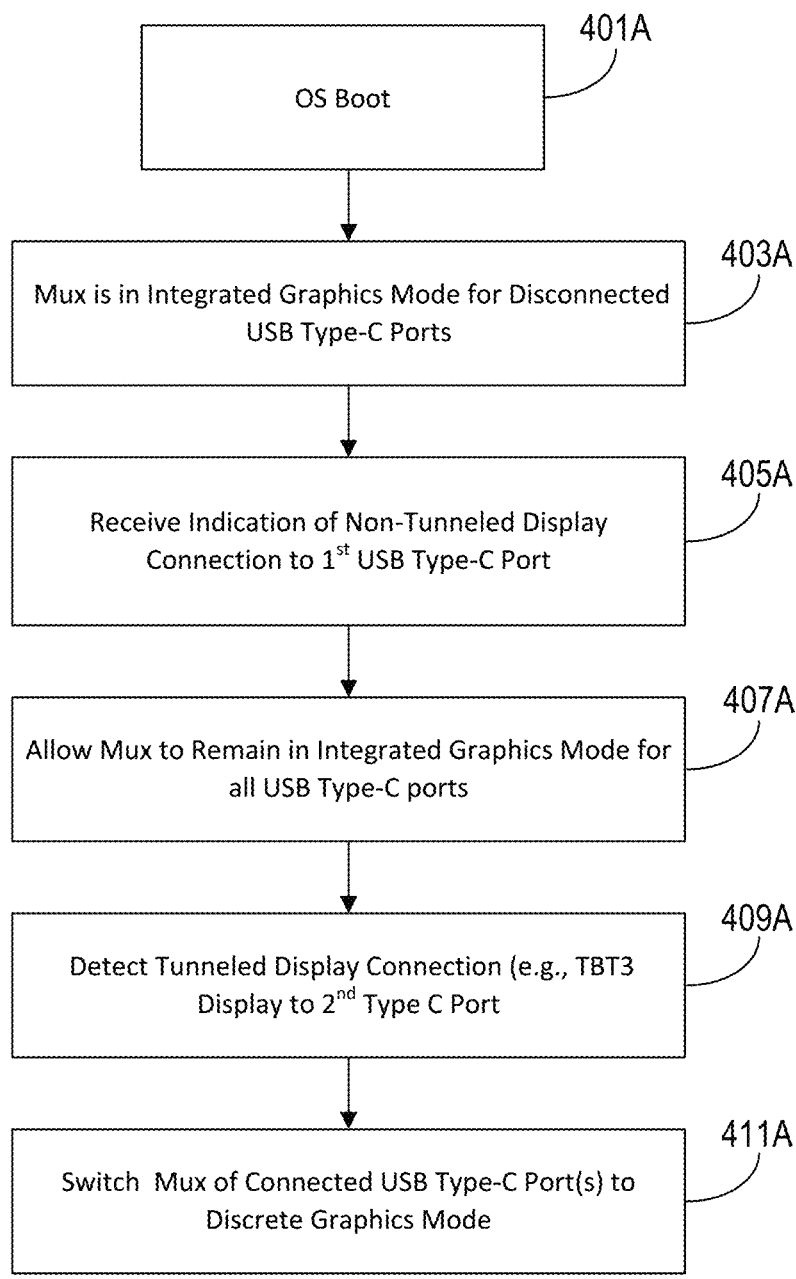
FIGS. 4A and 4B are flow diagrams that depict embodiments associated with additional policies related to the example USB Type-C ecosystem of FIG. 1, according to embodiments of the present disclosure.
Figure 4B:
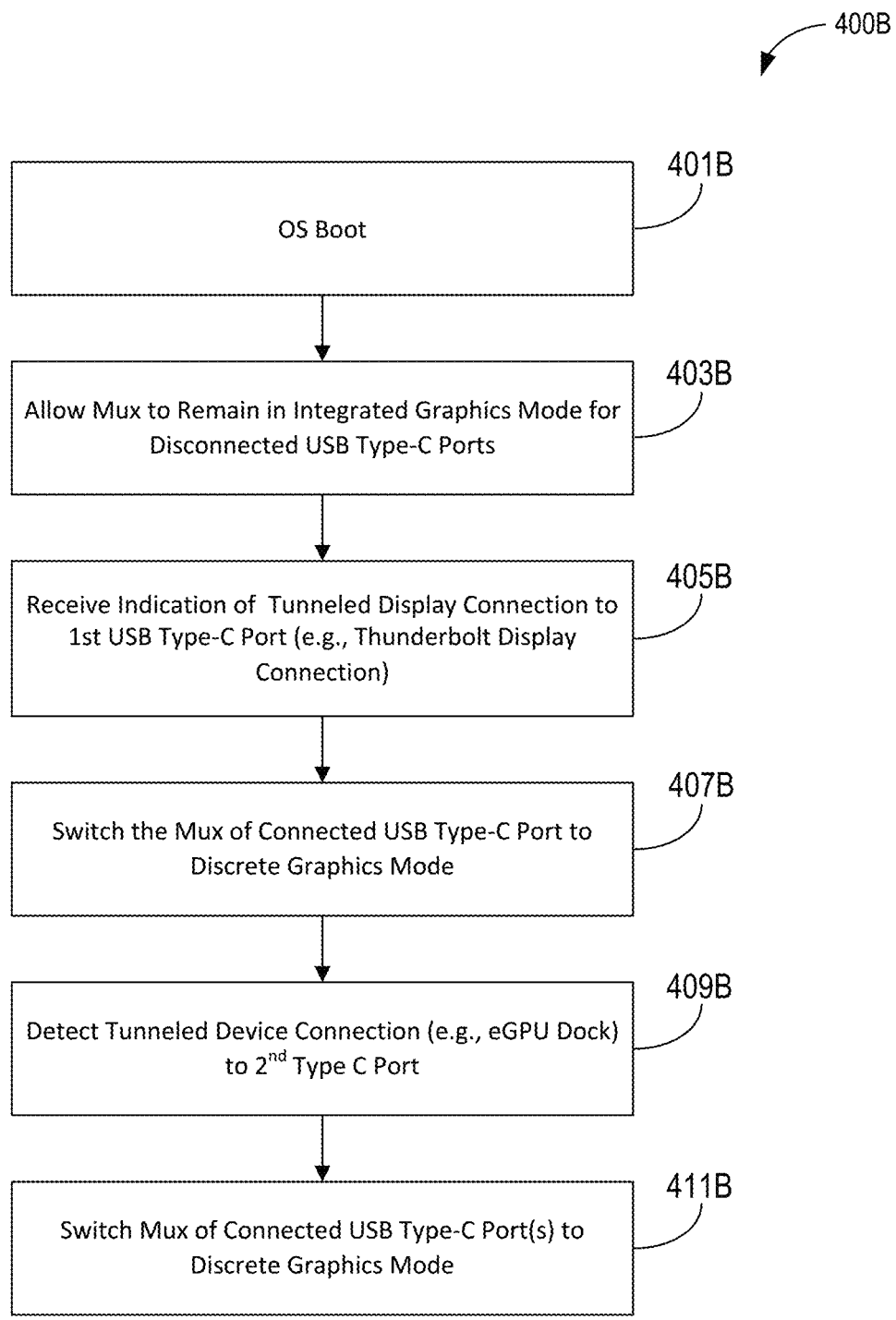

Referring now to FIGS. 4A and 4B which are methods 400A and 400B that depict embodiments associated with additional platform policies, according to embodiments. Methods 400A and 400B are associated with policies for dynamically switching between a discrete graphics mode and an integrated graphics mode when a tunneled display is connected to an external USB C Type-C port. In embodiments, a "tunneled display" may refer to a display coupled or connected via a link utilizing a tunneling architecture to combine underlying protocols to be used as a single interface along substantially all channels of the link. In embodiments, certain elements of methods 400A and 400B may be performed by a controller (e.g., controller 101 of FIG. 1, such as a PD controller) alone or in conjunction with an embedded controller (EC).

In the embodiment, method 400A, begins at a block 401A, where a platform boots to an OS runtime. As shown at next block 403A, one or more multiplexers ("Mux" in the FIG. 4), remain in a (default) integrated graphics mode for disconnected USB Type-C ports. In some embodiments, the disconnected USB Type-C ports include all disconnected USB Type-C ports on the platform. In embodiments, at a next block 405A, the controller detects or is notified of a USB Type-C display connection to a first USB Type-C port. In the embodiment, the USB Type-C display connection includes a non-tunneled display connection, such as but not limited to, a display connected through standard DisplayPort™ (DP) connection that is natively configured. Accordingly, there is less need for one or more multiplexers to be dynamically switched to a discrete graphics mode. Thus, at block 407A, one or more multiplexers for the USB Type-C ports are allowed by the controller to remain in the integrated graphics mode. At a next block 409A, the controller detects or is notified of a connection by a second display to a $2^{nd}$ USB Type-C port. In embodiments the $2^{nd}$ display includes a tunneled display connection, such as for example, but not limited to, a THUNDERBOLT™ connected display, USB4 display, or THUNDERBOLT™ dock (TBT3) device. Accordingly in embodiments, at a block 411A, the controller switches at least the multiplexer of the $2^{nd}$ USB Type-C port to discrete graphics mode.

Referring now to FIG. 4B, which depicts another method 400B where the controller switches one or more multiplexers to the discrete graphics mode when a tunneled display connection is made. In the embodiment, at a beginning block 401B, the platform boots to an OS runtime. At block 403B, method 400B includes allowing one or more multiplexers to remain in a default integrated graphics mode for disconnected (external) USB Type-C ports. In the embodiment, at a next block 405B, method 400B includes to receive notification or a detection of a tunneled display connection to a first USB Type-C port, e.g., a display connected via a THUNDERBOLT™ cable (e.g., THUNDERBOLT™ 3 cable) or USB4 display. At next block 407B, method 400B includes dynamically switching one or more multiplexers of the now connected first USB Type-C port to a discrete graphics mode. In the embodiment, at a next box 405B, method 400B includes detecting or receiving notification of a tunneled device. For example, in some embodiments, an external graphics processing unit (eGPU) is connected to a second (external) USB Type-C port. At a last block 411B, method 400B includes switching one or more multiplexers of the second USB Type-C ports to the discrete graphics mode.

Figure 5:
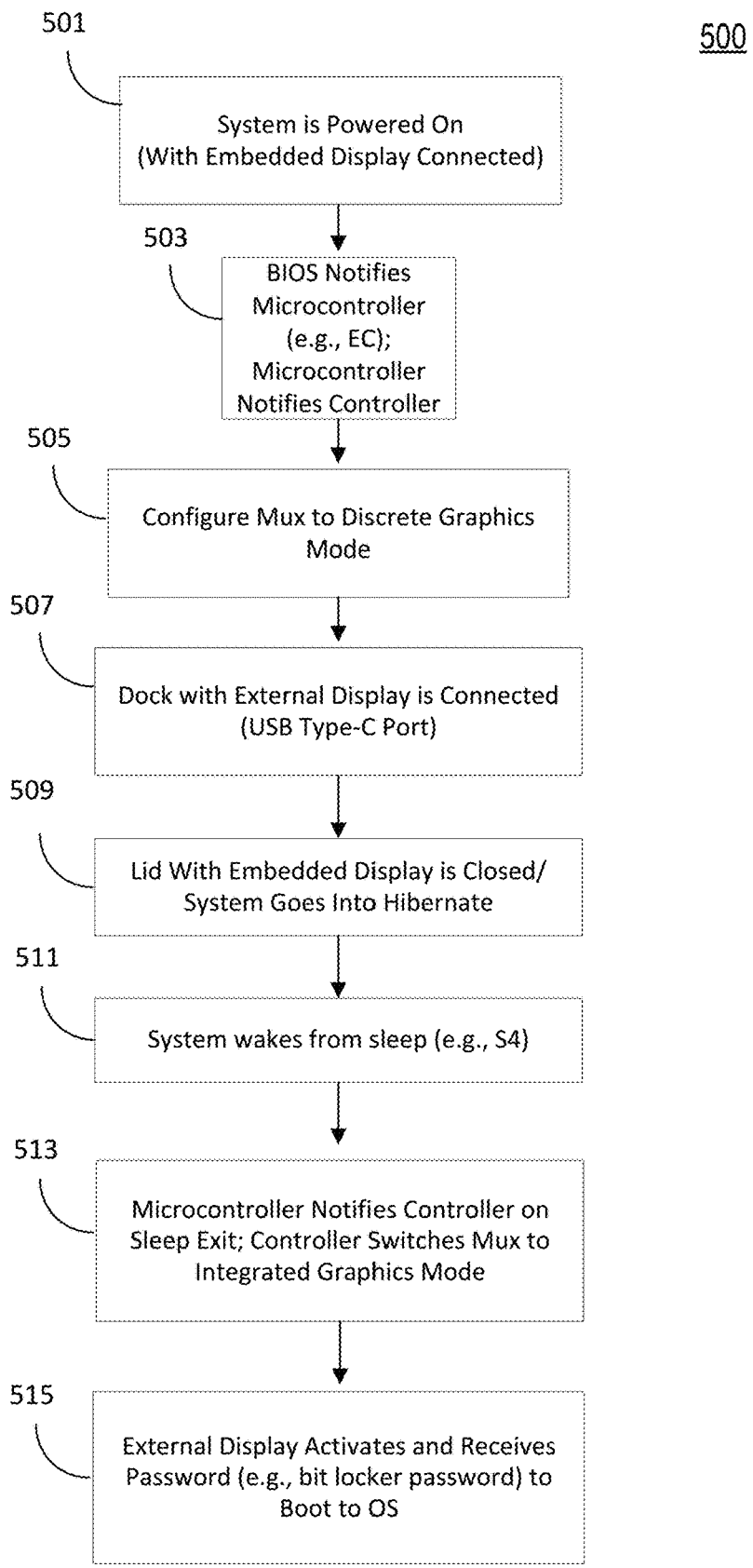
FIG. 5 is a flow diagram depicting an embodiment associated with an additional policy related the example USB Type-C ecosystem of FIG. 1, in accordance with various embodiments of the present disclosure.

FIG. 5 is a flow diagram depicting an embodiment associated with another additional policy related the example USB Type-C ecosystem of FIG. 1. FIG. 5 depicts a method 500 associated with a computing system or platform transition from a pre-OS phase to an OS phase. In embodiments, method 500 describes notifications between a controller (e.g. controller 101 of FIG. 1) and a microcontroller, e.g., an EC, during a pre-OS phase to enable a dynamic switch from an integrated graphics mode of the pre-OS phase to a discrete graphics mode during an OS runtime. In embodiments described below, a primary display lid of a computing system, such as a laptop, in the example below, is closed and the computing system is resumed from a low power or sleep phase (e.g., S4).

To begin, at a first block 501, the laptop with a connected embedded display is powered on. In embodiments, the connected embedded display includes a primary display of the laptop that is open. In embodiments, one or more multiplexers are in a default integrated graphics mode of the pre-OS phase. In embodiments, at a next block 503, BIOS notifies a microcontroller (e.g., EC) and EC notifies the controller, that multiplexers are to be switched to the discrete graphics mode after OS handoff.

Accordingly, at a next block 505, in the embodiment, OS handoff has occurred and the controller configures one or more multiplexers to dynamically switch to the discrete graphics mode. At block 507, the computing system or laptop is connected to a dock having an external display via a USB Type-C port. In embodiments, at block 509, the lid including the embedded display is closed and the computing system is allowed to go into low power mode or sleep mode. At a block 511, the computing system wakes from sleep mode in response to input from a keyboard attached to the dock. Next, for the embodiment, at block 513, the microcontroller (e.g., EC) notifies the controller that the computing system is exiting sleep phase and the controller dynamically switches one or more multiplexers to the integrated graphics mode. At a last block 515, the external display attached to the dock is activated. In embodiments, a bit locker password is entered by a user (via the external display) in order for the platform to boot to OS.

As described above, embodiments of the present disclosure include apparatuses, methods, and systems, for implementing policies for dynamically switching a platform between a first graphics mode, e.g., an integrated graphics mode, and a second graphics mode, e.g., a discrete graphics mode, associated with providing a display signal to an external USB Type-C port. Note that embodiments described above includes dynamic switching between integrated graphics mode and discrete graphics mode during an application runtime, which may be different from static or one-time switching between discrete graphics modes and integrated graphics modes. In embodiments, dynamic switching includes real-time switching during OS runtime between the integrated graphics controller and the discrete graphics controller. Please also note that the flow diagrams of FIGS. 2-5 are simplified and one or more elements may have been omitted in order to avoid obscuring the embodiments. In addition, although the blocks have been described using modifiers such as "next block" or "first block," the order of the blocks in FIGS. 2-5 are only exemplary and may be performed in a different order, in parallel, or with certain blocks omitted or replaced.

Figure 6:
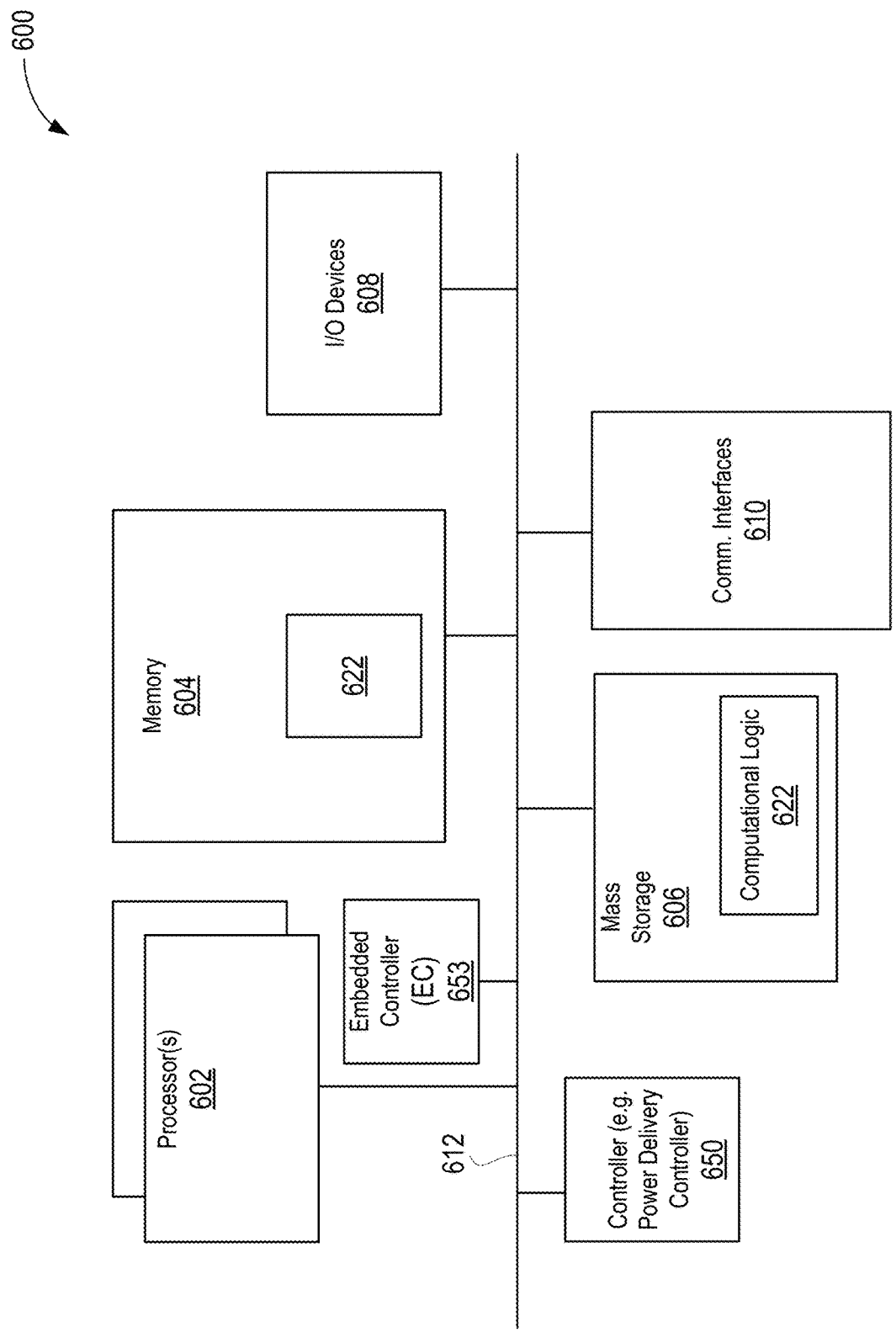
FIG. 6 is a diagram of a computing system associated with embodiments of FIGS. 1-5, in accordance with various embodiments of the present disclosure.

FIG. 6 illustrates an example computing device 600 that may include a USB Type-C ecosystem, such as the USB Type-C ecosystem 100 of FIG. 1, in accordance with various embodiments. Specifically, in some embodiments, the computing device 600 may include a controller 550 (e.g., a PD controller), similar to controller 101, of FIG. 1 and a microcontroller, e.g., EC 553, for implementing policies for dynamically switching multiplexers of computing device 600 between a first graphics mode and a second graphics mode. In embodiments, controller 550 configures or controls corresponding multiplexers to dynamically switch between an integrated graphics mode and a discrete graphics mode for providing a display signal to an external USB Type-C port.

In various embodiments, controller 550 and EC 553 of the present disclosure, is implemented as hardware, firmware, software, or some combination thereof. As shown, computing device 600 may include one or more processors or processor cores 602 and system memory 604. For the purpose of this application, including the claims, the terms "processor" and "processor cores" may be considered synonymous, unless the context clearly requires otherwise. The processor 602 may include any type of processors, such as a central processing unit (CPU), a microprocessor, and the like. The processor 602 may be implemented as an integrated circuit having multi-cores, e.g., a multi-core microprocessor.

In embodiments, at least one of the processors 502 may be included in a System on Chip (SoC) that includes a USB Type-C subsystem and implements an integrated graphics controller which may be similar to, e.g., integrated graphics controller 108 of FIG. 1. In embodiments, at least one of the processors 502 may be included in a discrete graphics controller, such as discrete graphics controller 109 of FIG. 1. In embodiments, the discrete graphics controller may be in a graphics card or graphics chip separate from certain other processors 502.

The computing device 600 may include mass storage devices 606 (such as diskette, hard drive, volatile memory (e.g., dynamic random-access memory (DRAM), compact disc read-only memory (CD-ROM), digital versatile disk (DVD), and so forth). In general, system memory 604 and/or mass storage devices 606 may be temporal and/or persistent storage of any type, including, but not limited to, volatile and non-volatile memory, optical, magnetic, and/or solid state mass storage, and so forth. Volatile memory may include, but is not limited to, static and/or dynamic random-access memory. Non-volatile memory may include, but is not limited to, electrically erasable programmable read-only memory, phase change memory, resistive memory, and so forth.

The computing device 600 may further include input/output (I/O) interface 608 to receive one or more I/O devices (such as a display (e.g., a touchscreen display), keyboard, cursor control, remote control, gaming controller, image capture device, and so forth) and communication interfaces 610 (such as network interface cards, modems, infrared receivers, radio receivers (e.g., Bluetooth), and so forth). In embodiments, I/O interface 608 includes USB Type-C ports and may connect to various devices discussed in connection with FIGS. 1-5.

In embodiments, computing device 600 may include at least one or more of an embedded display and a first and a second external display to couple to a first or a second USB Type-C port.

The communication interfaces 610 may include communication chips (not shown) that may be configured to operate the device 600 in accordance with a Global System for Mobile Communication (GSM), General Packet Radio Service (GPRS), Universal Mobile Telecommunications System (UMTS), High Speed Packet Access (HSPA), Evolved HSPA (E-HSPA), or Long-Term Evolution (LTE) network. The communication chips may also be configured to operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication chips may be configured to operate in accordance with Code Division Multiple Access (CDMA), Time Division Multiple Access (TDMA), Digital Enhanced Cordless Telecommunications (DECT), Evolution-Data Optimized (EV-DO), derivatives thereof, as well as any other wireless protocols that are designated as 3G, 4G, 5G, and beyond. The communication interfaces 610 may operate in accordance with other wireless protocols in other embodiments.

The above-described computing device 600 elements may be coupled to each other via system bus 612, which may represent one or more buses. In the case of multiple buses, they may be bridged by one or more bus bridges (not shown). Each of these elements may perform its conventional functions known in the art. In particular, system memory 604 and mass storage devices 606 may be employed to store a working copy and a permanent copy of the programming instructions for implementing the operations of an operating system or one or more applications, collectively referred to as computational logic 622. The various elements may be implemented by assembler instructions supported by processor(s) 602 or high-level languages that may be compiled into such instructions. Computational logic 622 may store instructions for implementing elements of one or more of methods associated with FIGS. 2-5. Computational logic 622 may also be included or implemented by, e.g., controller 650 and/or EC 653.

The permanent copy of the programming instructions may be placed into mass storage devices 606 in the factory, or in the field, through, for example, a distribution medium (not shown), such as a compact disc (CD), or through communication interface 610 (from a distribution server (not shown)). That is, one or more distribution media having an implementation of the agent program may be employed to distribute the agent and to program various computing devices.

The number, capability, and/or capacity of the elements 608, 610, 612 may vary, depending on whether computing device 600 is used as a stationary computing device, such as a set-top box or desktop computer, or a mobile computing device, such as a tablet computing device, laptop computer, game console, or smartphone. Their constitutions are otherwise known, and accordingly will not be further described.

For one embodiment, at least one of processors 602 may be packaged together with computational logic 622 configured to practice aspects of optical signal transmission and receipt described herein to form a System in Package (SiP) or a System on Chip (SoC).

In various implementations, the computing device 600 may comprise one or more components of a data center, a laptop, a netbook, a notebook, an ultrabook, a smartphone, a tablet, a personal digital assistant (PDA), an ultra mobile PC, a mobile phone, or a digital camera. In further implementations, the computing device 600 may be any other electronic device that processes data.

Accordingly, in embodiments, a method to implement a policy to dynamically switch between a first graphics mode and a second graphics mode as a primary source of a display signal to be provided to an external USB-C port is described. In embodiments, the method includes receiving, by a controller, an indication that the first graphics mode should be switched to the second graphics mode or the second graphics mode should be switched to the first graphics mode. The method further includes controlling, by the controller, at least a first or a second multiplexer to, based on the policy, switch to the first graphics mode to output signals received from an internal USB-C Type-C port of an integrated graphics controller to the USB-C port or switch to the second graphics mode to output the signals received from an internal USB-C Type-C port of a discrete graphics controller to the external USB-C port.

Illustrative examples of the technologies disclosed herein are provided below. An embodiment of the technologies may include any one or more, and any combination of, the examples described below.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Embodiments may be implemented as a computer process, a computing system or as an article of manufacture such as a computer program product of computer readable media. The computer program product may be a computer storage medium readable by a computer system and encoding a computer program instructions for executing a computer process.

The corresponding structures, material, acts, and equivalents of all means or steps plus function elements in the claims below are intended to include any structure, material or act for performing the function in combination with other claimed elements are specifically claimed. The description of the present disclosure has been presented for purposes of illustration and description, but is not intended to be exhaustive or limited to the disclosure in the form disclosed. Many modifications and variations will be apparent to those of ordinary skill without departing from the scope and spirit of the disclosure. The embodiment are chosen and described in order to best explain the principles of the disclosure and the practical application, and to enable others of ordinary skill in the art to understand the disclosure for embodiments with various modifications as are suited to the particular use contemplated.

Example 1 may include an apparatus to dynamically switch between a first graphics mode and a second graphics mode for providing a display signal to an external USB Type-C port, comprising: an interface; a controller coupled to the interface to provide signals via the interface to a first multiplexer and to a second multiplexer, wherein the controller is to, based on a platform policy, control the at least first or the second multiplexer to dynamically switch to the first graphics mode to output signals received from an integrated graphics controller to the external USB Type-C port or to switch to the second graphics mode to output signals received from a discrete graphics controller to the external USB Type-C port.

Example 2 may include the apparatus of Example 1, wherein the controller is a power delivery (PD) controller.

Example 3 may include the apparatus of Example 1, further comprising: the first multiplexer, wherein the first multiplexer is coupled to receive a first signal from a first USB Type-C port of the discrete graphics controller and a second signal from a first port of the USB Type-C port of an integrated graphics controller; and the second multiplexer coupled to receive a third signal from a second USB Type-C port of the discrete graphics controller and a fourth signal from a second USB Type-C port of the integrated graphics controller.

Example 4 may include the apparatus of Example 1, wherein the first and second ports of the integrated graphics controller and the discrete graphics controller include internal USB Type-C ports.

Example 5 may include the apparatus of Example 1, wherein the policy includes to control the first multiplexer and the second multiplexer to operate in the first graphics mode when the platform is in a battery mode and to operate in the discrete graphics mode when the platform is in an AC mode.

Example 6 may include the apparatus of Example 5, wherein the controller is to receive a signal from an embedded controller (EC) to determine whether the platform is in battery mode or AC mode.

Example 7 may include the apparatus of Example 1, wherein the controller is to implement a policy to cause the at least first or the second multiplexer to dynamically switch to the second graphics mode if a display coupled to the at least first or the second multiplexer via the external USB Type-C port is connected to a tunneled display.

Example 8 may include the apparatus of Example 1, wherein the controller is to implement the policy to manage a timing of a switch to the first graphics mode or the second graphics mode by the first or second multiplexer according to a platform timing of a Basic Input/Output System (BIOS) and Operating System (OS) handoff.

Example 9 may include the apparatus of Example 1, wherein the controller is further arranged to delay implementation of the policy until the external USB-C port has been disconnected from an external display or other device if the policy is not supported.

Example 10 may include the method to implement a policy to dynamically switch between a first graphics mode and a second graphics mode as a primary source of a display signal to be provided to an external USB-C port, comprising: receiving, by a controller, an indication that the first graphics mode should be switched to the second graphics mode or the second graphics mode should be switched to the first graphics mode; and controlling, by the controller, at least a first or a second multiplexer to, based on the policy, switch to the first graphics mode to output signals received from an internal USB-C Type-C port of an integrated graphics controller to the USB-C port or switch to the second graphics mode to output the signals received from an internal USB-C Type-C port of a discrete graphics controller to the external USB-C port.

Example 11 may include the method of Example 10, wherein controlling, by the controller, the at least a first or a second multiplexer includes to control the first multiplexer and the second multiplexer to operate in the first graphics mode when a platform including the controller is in a battery mode and to operate in the discrete graphics mode when the platform is in an AC mode.

Example 12 may include the method of Example 10, wherein controlling, by the controller, the at least the first or the second multiplexer includes to dynamically switch from between the first graphics mode and the second graphics mode if a display coupled to the at least first or the second multiplexer via the external USB Type-C port is connected to a tunneled display Example 13 may include the method of Example 10, wherein receiving, by the controller, the indication that the first graphics mode should be switched to the second graphics mode or the second graphics mode should be switched to the first graphics mode includes receiving an indication from a microcontroller coupled to a power source of a platform including the controller.

Example 14 may include the method of Example 10, wherein controlling, by the controller, the at least first or second multiplexer to, switch to the first graphics mode or to the second graphics mode, includes to delay the switch to the first graphics mode or to the second graphics mode if the policy is not supported.

Example 15 may include a system to dynamically switch between a first graphics mode and a second graphics mode for providing a display signal to an external USB Type-C port, comprising: a first graphics controller; a second graphics controller; and a power delivery (PD) controller coupled to the first graphics controller and the second graphics controller to provide signals to a first multiplexer and to a second multiplexer, wherein the controller is to, based on a platform policy, control the at least first or the second multiplexer to dynamically switch to the first graphics mode to output signals received in an integrated graphics mode to the external USB Type-C port or to switch to the second graphics mode to output signals received from a discrete graphics mode to the external USB Type-C port.

Example 16 may include the system of Example 15, wherein the first graphics controller is an integrated graphics controller and the second graphics controller is a discrete graphics controller.

Example 17 may include the system of Example 16, further comprising an embedded controller (EC) coupled to the PD controller to notify the PD of when, the controller is to, based on the platform policy, control the at least first or the second multiplexer to dynamically switch to the first graphics mode or to the second graphics mode.

Example 18 may include the system of Example 15, further comprising the first multiplexer, wherein the first multiplexer is coupled to receive a first signal from a first USB Type-C port of the discrete graphics controller and a second signal from a first port of the USB Type-C port of an integrated graphics controller; and the second multiplexer coupled to receive a third signal from a second USB Type-C port of the discrete graphics controller and a fourth signal from second a USB Type-C port of the integrated graphics controller.

Example 19 may include the system of any one of Examples 15-18, further comprising a system on a chip (SoC), wherein the integrated graphics controller is integrated into the SoC.

Example 20 may include the system of Example 15, further including at least one or more of an embedded display and a first and a second external display to couple to the first or the second USB Type-C port.

Various embodiments may include any suitable combination of the above-described embodiments including alternative (or) embodiments of embodiments that are described in conjunctive form (and) above (e.g., the "and" may be "and/or"). Furthermore, some embodiments may include one or more articles of manufacture (e.g., non-transitory computer-readable media) having instructions, stored thereon, that when executed result in actions of any of the above-described embodiments. Moreover, some embodiments may include apparatuses or systems having any suitable means for carrying out the various operations of the above-described embodiments.

The above description of illustrated implementations, including what is described in the Abstract, is not intended to be exhaustive or to limit the embodiments of the present disclosure to the precise forms disclosed. While specific implementations and examples are described herein for illustrative purposes, various equivalent modifications are possible within the scope of the present disclosure, as those skilled in the relevant art will recognize.

These modifications may be made to embodiments of the present disclosure in light of the above detailed description. The terms used in the following claims should not be construed to limit various embodiments of the present disclosure to the specific implementations disclosed in the specification and the claims. Rather, the scope is to be determined entirely by the following claims, which are to be construed in accordance with established doctrines of claim interpretation.

What is claimed is:

1. An apparatus comprising:
   an interface circuit; and
   a controller circuit to control a multiplexer to switch an external USB Type-C port from an integrated graphics mode to a discrete graphics mode in response to disconnection of a display device from the external USB Type-C port, the multiplexer to couple the external USB Type-C port to a discrete graphics controller in the discrete graphics mode, the multiplexer to couple the external USB Type-C port to an integrated graphics controller in the integrated graphics mode.

2. The apparatus of claim 1, wherein the controller circuit is a power delivery (PD) controller circuit.

3. The apparatus of claim 1, wherein the controller circuit is to control the multiplexer to:
   operate in the integrated graphics mode when the apparatus is in a battery mode; and
   operate in the discrete graphics mode when the apparatus is in an external power mode.

4. The apparatus of claim 3, wherein the controller circuit is to determine whether the apparatus is in the battery mode or the external power mode based on an input signal.

5. The apparatus of claim 1, wherein the controller circuit is to control the multiplexer to switch the external USB Type-C port to the discrete graphics mode in response to connection of the external USB Type-C port to a tunneled display device.

6. The apparatus of claim 1, wherein the controller circuit is to determine to delay the switch of the external USB Type-C port from the integrated graphics mode to the discrete graphics mode until after the disconnection of the display device based on whether the apparatus has a capability to prevent display of a blank frame when the external USB Type-C port is switched from the integrated graphics mode to the discrete graphics mode.

7. A method comprising:
   determining, by a controller circuit, whether an external USB Type-C port is to be switched from an integrated graphics mode to a discrete graphics mode; and
   controlling, by the controller circuit, a multiplexer to switch the external USB Type-C port from the integrated graphics mode to the discrete graphics mode in response to disconnection of a display device from the external USB Type-C port, the multiplexer to couple the external USB Type-C port to a discrete graphics controller in the discrete graphics mode, the multiplexer to couple the external USB Type-C port to an integrated graphics controller in the integrated graphics mode.

8. The method of claim 7, wherein the controlling of the multiplexer includes:
   controlling the multiplexer to operate in the integrated graphics mode when a platform including the controller circuit is in a battery mode; and
   controlling the multiplexer to operate in the discrete graphics mode when the platform is in an external power mode.

9. The method of claim 7, further including controlling the multiplexer to switch from the integrated graphics mode to the discrete graphics mode in response to connection of the external USB Type-C port to a tunneled display device.

10. The method of claim 7, wherein the determining is based on an indication from a microcontroller coupled to a power source of a platform including the controller circuit.

11. The method of claim 7, further including determining whether to delay the switch of the external USB Type-C port from the integrated graphics mode to the discrete graphics mode until after the disconnection of the display device based on whether a platform including the controller circuit has a capability to prevent display of a blank frame when the external USB Type-C port is switched from the integrated graphics mode to the discrete graphics mode.

12. A system comprising:
   an integrated graphics controller circuit;
   a discrete graphics controller circuit; and
   a power delivery (PD) controller circuit to control a multiplexer to switch an external USB Type-C port from an integrated graphics mode to a discrete graphics mode in response to disconnection of a display device from the external USB Type-C port, the multiplexer to couple the external USB Type-C port to the discrete graphics controller circuit in the discrete graphics mode, the multiplexer to couple the external USB Type-C port to the integrated graphics controller circuit in the integrated graphics mode.

13. The system of claim 12, further including an embedded controller (EC) circuit coupled to the PD controller circuit to notify the PD controller circuit when the PD controller circuit is to control the multiplexer to switch the external USB Type-C port to be coupled to the integrated graphics controller circuit or to the discrete graphics controller circuit.

14. The system of claim 12, further including the multiplexer, wherein a first input of the multiplexer is coupled to an internal USB Type-C port of the discrete graphics controller circuit and a second input of the multiplexer is coupled to an internal USB Type-C port of the integrated graphics controller circuit.

15. The system of claim 12, further including a system on a chip (SoC), wherein the integrated graphics controller circuit is integrated into the SoC.

16. The system of claim 12, wherein the PD controller circuit is to determine whether to delay the switch of the coupling of the external USB Type-C port from the integrated graphics controller circuit to the discrete graphics controller circuit until after the disconnection of the display device based on whether the system has a capability to prevent display of a blank frame when the external USB Type-C port is switched from being coupled to the integrated graphics controller circuit to being coupled to the discrete graphics controller circuit.

17. The system of claim 12, wherein the PD controller circuit is to control the multiplexer to switch the external USB Type-C port to be coupled to the discrete graphics controller circuit in response to connection of the external USB Type-C port to a tunneled display device.

* * * * *